(12) United States Patent
Jeon (10) Patent No.: US 6,442,712 B1
(45) Date of Patent: Aug. 27, 2002

(54) APPARATUS AND METHOD UTILIZED TO AUTOMATICALLY TEST A COMPUTER

(75) Inventor: Young-Il Jeon, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/076,738

(22) Filed: May 13, 1998

(30) Foreign Application Priority Data

May 15, 1997 (KR) ............................................. 97-18791

(51) Int. Cl.[7] .............................................. G06F 11/277
(52) U.S. Cl. ............................. 714/43; 714/44; 348/129
(58) Field of Search .............................. 714/43, 44, 37; 348/129, 130

(56) References Cited

U.S. PATENT DOCUMENTS

| | | | |
|---|---|---|---|
| 4,065,647 A | | 12/1977 | Frye et al. |
| 4,455,634 A | | 6/1984 | Efron et al. |
| 4,524,444 A | | 6/1985 | Efron et al. |
| 4,623,837 A | | 11/1986 | Efron et al. |
| 4,670,709 A | | 6/1987 | Iredale |
| 5,309,376 A | | 5/1994 | Barraco et al. |
| 5,432,548 A | | 7/1995 | Byen et al. |
| 5,526,043 A | | 6/1996 | Wen |
| 5,574,500 A | | 11/1996 | Hamada et al. |
| 5,596,364 A | | 1/1997 | Wolf et al. |
| 5,644,505 A | | 7/1997 | Soutar et al. |
| 5,655,072 A | * | 8/1997 | Wolff .......................... 714/25 |
| 5,881,221 A | * | 3/1999 | Hoang et al. .................. 714/42 |
| 5,991,805 A | * | 11/1999 | Krukovsky ................. 709/229 |
| 5,991,897 A | * | 11/1999 | Perugini et al. .............. 714/27 |

* cited by examiner

*Primary Examiner*—Scott Badesman
(74) *Attorney, Agent, or Firm*—Robert E. Bushnell, Esq.

(57) ABSTRACT

An apparatus and method utilized to automatically test a computer is provided. By using the data storage medium for testing in which video data and audio data for testing are stored in different positions, output video data and output audio data are produced by applying the video and audio data for testing to a video board and an audio board, respectively, and determining whether the video and audio data for testing and the output video and audio data are the same, thereby testing automatically whether the video board and the audio board are functioning normally.

25 Claims, 10 Drawing Sheets

APPARATUS AND METHOD UTILIZED TO AUTOMATICALLY TEST A COMPUTER

CLAIM OF PRIORITY

This application makes reference to, incorporates the same herein, and claims all benefits accruing under 35 U.S.C. §119 from an application entitled Testing Data Storage Medium For Automatizing Test Of A Computer And Method Of Testing Automatically Using The Same earlier filed in the Korean Industrial Property Office on the May 15, 1997, and there duly assigned Ser. No. 18791/1997, a copy of which is annexed hereto.

BACKGROUND OF THE INVENTION

1. Technical Field

The present invention relates to an apparatus and method utilized to automatically test a computer, and more particularly, an apparatus and method utilized to automatically test an audio board and a video board of a computer.

2. Related Art

Computer systems are information handling systems that are utilized by many individuals and businesses today. A computer system can be defined as a microcomputer that includes a central processing unit (CPU), a volatile memory, a non-volatile memory, a display monitor, a keyboard, a mouse, a floppy diskette drive, a compact disc-read only memory (CD-ROM) drive, a modem, a hard disk storage device, and a printer. Typically, a computer system's main board, which is a printed circuit board known as a motherboard, is used to electrically connect these components together.

Recently, because the rate of production of computer systems performing multimedia functions has rapidly increased, the steps involved in the testing processes for these computer systems have become complicated and difficult. It can be especially difficult to automate a multimedia test which tests a moving image and a musical performance. This is true because the moving image data, often utilizing a data compression standard developed by the Motion Picture Experts Group (MPEG), is located on a first compact disc-read only memory (CD-ROM) while the audio data is located on a second CD-ROM. Thus, during the testing process, the first CD-ROM must be ejected and replaced by the second CD-ROM. This replacement of CD-ROMs is time consuming and is an impediment to automating the testing process, where multimedia functionality of a video board and an audio board are tested. I have found that testing processes of computer systems can lack precise results, since precise results can be more costly to achieve, and more time consuming.

Examples of methods and devices testing video and audio signals are disclosed in U.S. Pat. No. 4,065,647 for Automatic Acoustical Testing System issued to Frye et al., U.S. Pat. No. 4,455,634 for Audio/Video Quality Monitoring System issued to Efron et al., U.S. Pat. No. 5,309,376 for Methods And Apparatus For Testing Image Processing Apparatus issued to Barraco et al., U.S. Pat. No. 5,644,505 for Universal Audio Analyzer issued to Soutar et al., U.S. Pat. No. 5,596,364 for Perception-Based Audio Visual Synchronization Measurement System issued to Wolf et al., U.S. Pat. No. 4,623,837 for Audio/Video Quality Monitoring System issued to Efron et al., U.S. Pat. No. 5,574,500 for Video Quality Evaluating Equipment For Reproduced Image Of Video Signal Subject To Digital Compression issued to Hamadaet al., U.S. Pat. No. 5,526,043 for Automatic Video Display Testing And Adjusting System issued to Wen, U.S. Pat. No. 4,670,709 for Portable Audio System And Audio Cable Continuity Tester issued to Iredale, U.S. Pat. No. 5,432,548 for Apparatus For Testing And Adjusting Audio/Video Signal Waveforms In color Television issued to Byen et al., and U.S. Pat. No. 4,524,444 for Analyzing The Signal Transfer Characteristic Of A Signal Processing Unit issued to Efron et al.

I have discovered that, even though there currently exist methods and devices testing video and audio signals, the available testing methods and devices lack a degree of precision and also require a tester to respond and intervene during the testing process.

SUMMARY OF THE INVENTION

Accordingly, it is an object of the present invention to provide an improved apparatus and method automating the process of testing of a computer system in order to precisely test a video board and an audio board of a computer system.

It is another object of the present invention to provide a data storage medium used during the testing of a computer, in which digital video data and digital audio data to be used during testing are stored at different positions on the data storage medium in such a manner as to enable a still video image, a moving video image, an audio signal, and other information, to be tested with a high degree of precision without a need for human intervention.

It is still another object of the present invention to provide a method of automatically testing whether a video board and an audio board of a computer are functioning normally using test data stored on a data storage medium.

These and other objects of the present invention can be achieved by storing digital video information and digital audio information in separate locations of a data storage medium and using the stored digital video information and audio information during testing.

Also, the above objects and other objects of the present invention can be achieved by performing the steps of: recording test video data and test audio data on a data storage medium; applying the test video data and test audio data to a video board and an audio board, respectively; producing output video data and output audio data; determining whether the test video data and the output video data are similar; determining whether the test audio data and the output audio data are similar; and testing automatically whether the video board and the audio board are functioning normally.

Preferably, the step of producing the output audio data includes a step of matching impedances of the test audio data before applying the test audio data to the audio board. A conventional compact disc-read only memory (CD-ROM) can be used for a data storage medium.

In recording the data to be tested, the digital video data is first recorded in any track, and then the digital audio data is recorded in a track next to the track in which the digital video data is recorded.

Moreover, the digital video data includes still image data and moving image data which are recorded in different tracks. At this time, the moving image data can be formed by repeatedly recording the still image data having the same content during a predetermined time. In addition, each color of red, green, and blue (RGB) in the still image data is successively arranged having any number of dots in the vertical direction.

The digital audio data is extracted by equally dividing audio signals within an audible frequency range and detecting by turns any divided audio signals among the audio signals which are equally divided.

Preferably, the digital audio data can be extracted by selecting each of audio signals of second, fourth and sixth frequency domains among the audio signals which are equally divided into 7 for one second, respectively.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
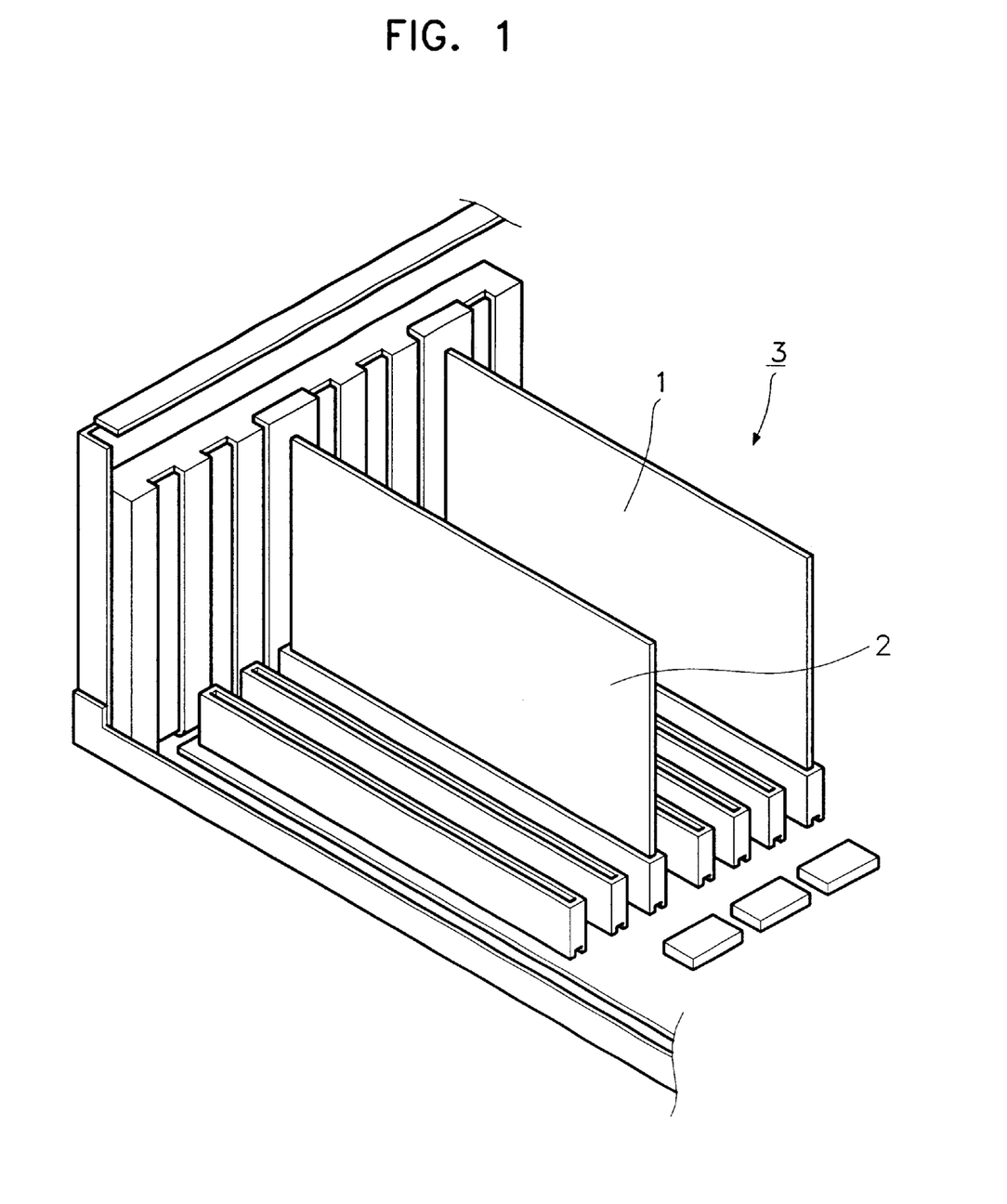
FIG. 1 illustrates a video board and an audio board mounted in a computer body.

Refer now to FIG. 1, which illustrates a video board and an audio board mounted in a computer body. At the rear side of a computer body 3, there is a video board 1 for signal-processing to display information on a monitor, and an audio board 2 for signal-processing to output an audio signal which is stored and outputted by a compact disc-read only memory (CD-ROM).

Figure 2:
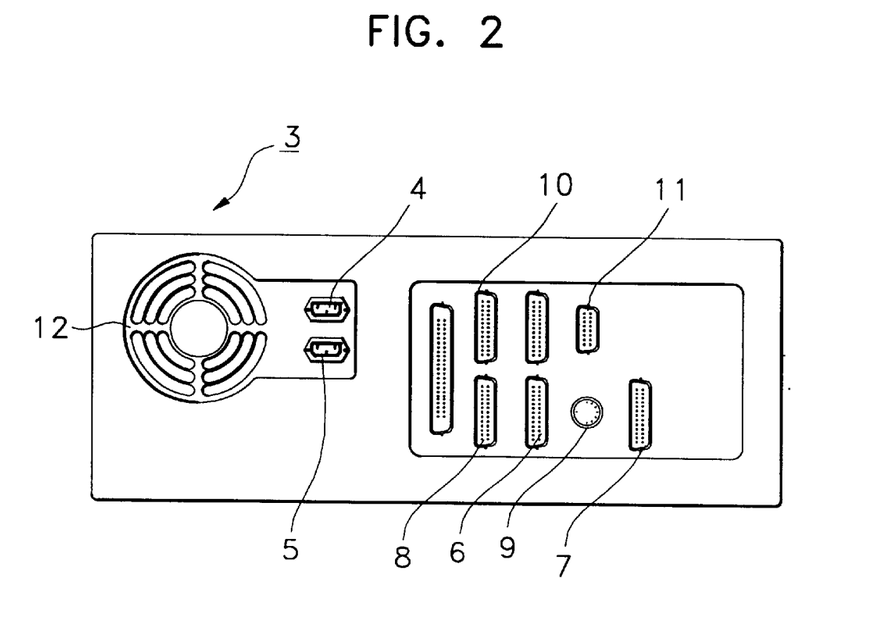
FIG. 2 illustrates the rear panel of the computer body shown in FIG. 1.

Turn now to FIG. 2, which illustrates the rear panel of the computer body shown in FIG. 1. At the rear side of the computer body 3, there is a power input terminal 4 to which power for home use is inputted, a power output terminal 5 from which power for home use is outputted, a video port 6 inputting and outputting a video signal, an audio port 7 inputting and outputting an audio signal, a modem port 8 to which an exclusive line or a public switched telephone network (PSTN) is connected, a keyboard terminal 9 to which a keyboard is connected, a joy stick terminal 10 to which a joy stick is connected, a mouse terminal 11 to which a mouse is connected, and a cooling fan 12.

Figure 3:
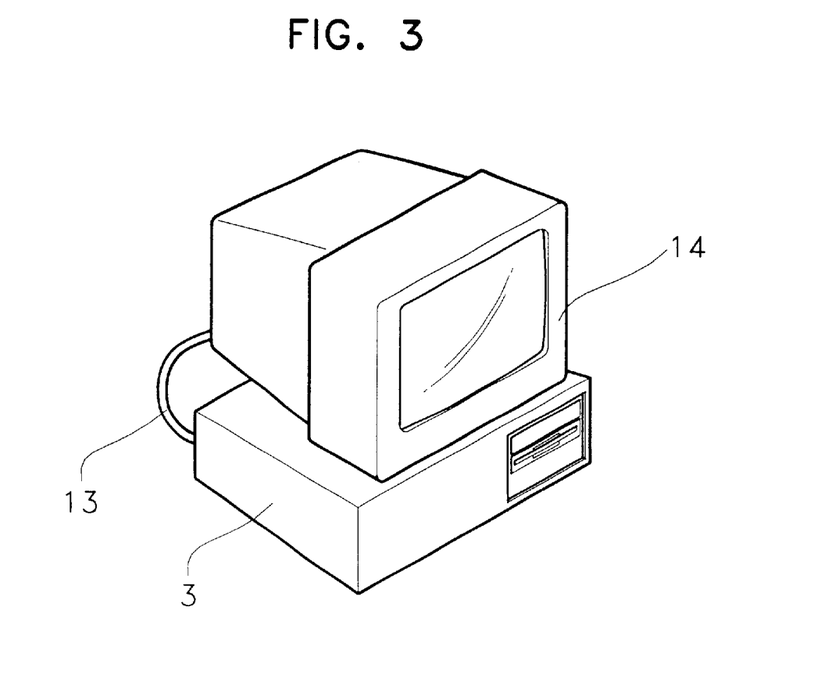
FIG. 3 illustrates the computer body shown in FIG. 2 connected to a monitor.

Turn now to FIG. 3, which illustrates the computer body shown in FIG. 2 connected to a monitor. The computer body 3 having the above-described structure is connected to the monitor 14 by a video cable 13, and the video signal which is signal-processed in the video board 1 is transmitted to the monitor 14 and then displayed.

One method of testing whether the video board 1 is functioning normally, after mounting the video board 1 to the computer body 3, can be performed by having a human operator view the monitor with an unaided human eye to confirm that they appear to be normal. Similarly, one method of testing whether the audio board 2 is functioning normally, after mounting the audio board 2 to the computer body 3, can be performed by having a human operator listen to audio signals produced by the computer to confirm that they sound normal.

However, the above-described methods of testing the video board 1 and the audio board 2 can be inaccurate and unreliable due to the inherent subjectivity of those methods. In other words, the results of the above-described test methods will depend upon subjective perceptions of individual human testers. Thus, one individual tester may conclude that the video and audio boards are satisfactory while a second individual tester may conclude that the video and audio boards are unsatisfactory. Subjective test methods can be extremely unreliable. Objective test methods, conversely, are more reliable because results can be perceived and agreed upon by all observers.

A second method of testing whether the video board 1 is functioning normally, after mounting the video board 1 to the computer body 3, uses a camera instead of an unaided human eye. Turn now to FIG. 4, which illustrates a test system used to test a video board of a computer.

Figure 4:
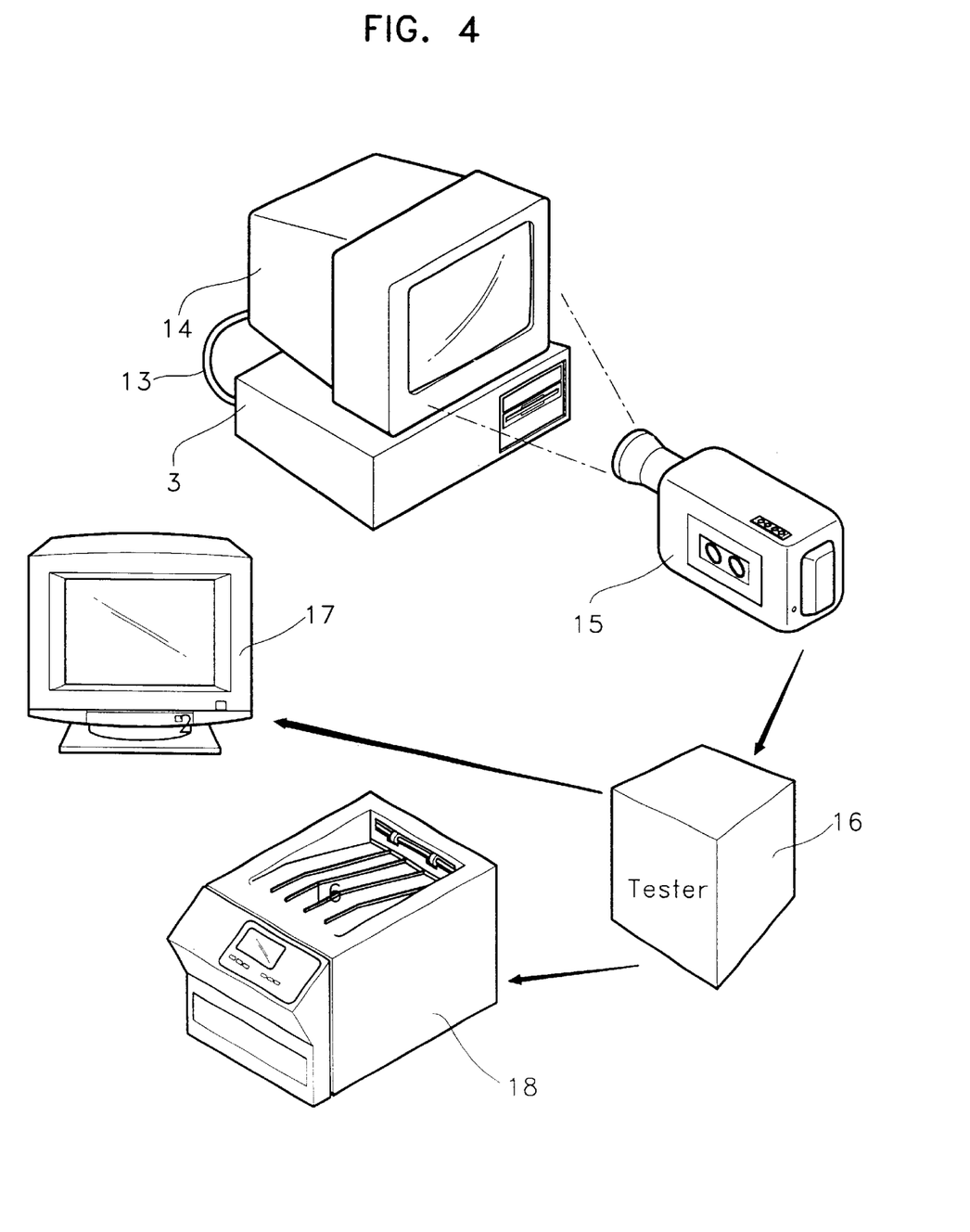
FIG. 4 illustrates a test system used to test a video board of a computer.

As shown in FIG. 4, first an image is displayed on a monitor 14 through a video board 1 mounted in the computer body 3. Then the image which is displayed on the monitor 14 is photographed by a video camera 15, typically utilizing charge-coupled devices. The photographed image is also known as the target image information. After that, the target image information is compared with preset reference image information in a tester 16. The result of the comparison is displayed on a monitor 17 or outputted to a printer 18 or both.

Figure 5:
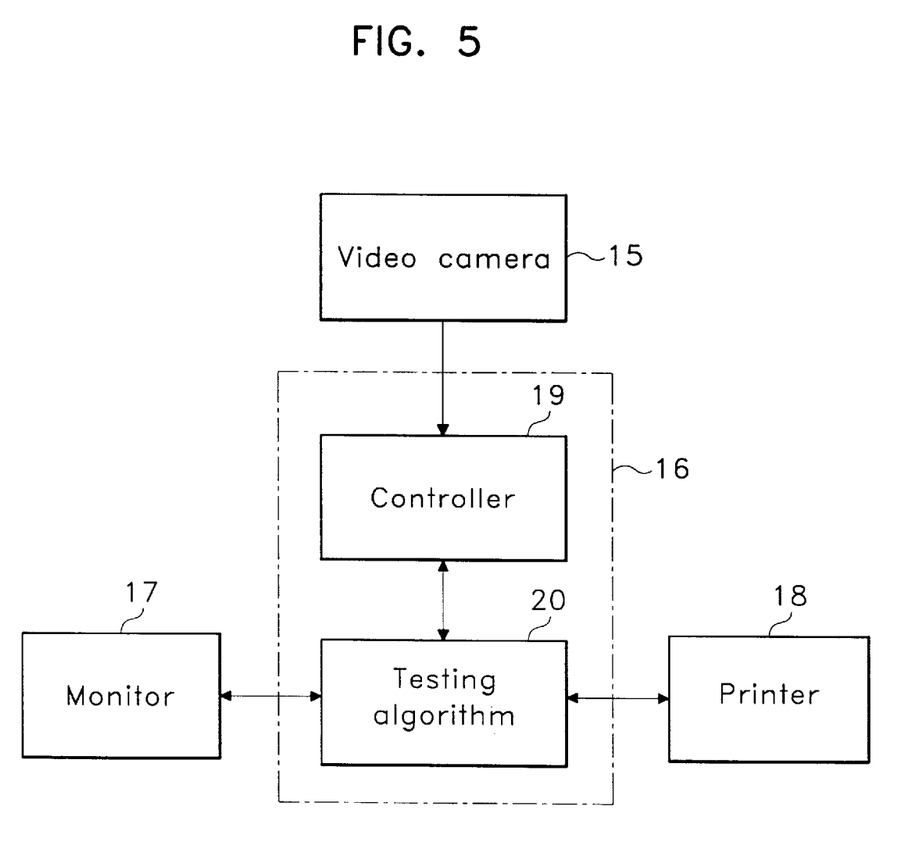
FIG. 5 is a block diagram of the test system shown in FIG. 4.

Turn now to FIG. 5, which is a block diagram of the test system shown in FIG. 4. As illustrated in FIG. 5, when the target image information is inputted to the tester 16, a controller 19 inside the tester 16 compares the target image information with the preset reference image information by substituting the target image information in a testing algorithm 20. The result of the comparison is displayed on a monitor 17 or outputted to a printer 18 or both. Then the target image information is converted into target image data of pixel units of red, green, and blue (RGB) colors through the controller 19. The converted data is divided into separate colors of red, green, and blue (RGB) dot units and then they are compared with the preset reference image information.

The range of colors that a specific system can handle is called the color space. In the RGB system used by personal computer monitors, the range of red, green, and blue signals define the three dimensions of the color space.

However, the method shown in FIGS. 4 and 5, testing a video board of a computer, has the following problems. First, since the target image information is photographed per unit of frame and is converted to a data format per unit of pixel, and the target image data is detected by dividing the converted data format per unit of dot, the process of testing is complicated and the testing speed is slow, thereby requiring a substantial amount of time to check the tested result.

Second, since the image displayed on the monitor is photographed by the video camera and the photographed target image information is compared with the reference image information, the information is influenced by the operational state and performance of the monitor. Accordingly, an precision test cannot be performed.

Third, since the screen resolution of the video camera is generally 640×480 pixels, when the screen resolution of a target monitor to be photographed is higher than that of the video camera, the video camera cannot fully correspond with the target monitor, and thereby the target image information cannot be detected precisely. Thus, a precision test cannot be performed.

In addition, since the target image which is displayed on the monitor is photographed using the video camera, it is difficult to synchronize the monitor and the video camera. Owing to the difficulty, an image flow phenomenon caused by a blanking is generated in the target image which is photographed, thereby degrading the precision and exactness of the test.

Recently, because the rate of production of computer systems performing multimedia functions has rapidly increased, the steps involved in the testing processes for these computer systems have become complicated and difficult. It can be especially difficult to automate a multimedia test which tests a moving image and a musical performance. This is true because the moving image data, often utilizing a data compression standard developed by the Motion Picture Experts Group (MPEG), is located on a first compact disc-read only memory (CD-ROM) while the audio data is located on a second CD-ROM. Thus, during the testing process, the first CD-ROM must be ejected and replaced by the second CD-ROM. This replacement of CD-ROMs is time consuming and is an impediment to automating the testing process, where multimedia functionality of a video board and an audio board are tested.

In other words, the test of the computer system is performed in steps which often require a human tester to perform a task such as eject a first CD-ROM and replace it with a second CD-ROM. Some steps require human intervention, and some steps do not require any human intervention. The steps which need no intervention are easily substituted with an automatic process. However, in steps which need human intervention or which need a response from a human tester, especially when the results are determined by the tester's feeling or perception, it is difficult to automate the test process.

In testing procedures, it can be necessary for the human tester to respond and intervene regarding the following test items. First, is a still image displayed normally? Second, is the moving image displayed normally? Third, is the musical performance stored on the CD-ROM normal? Fourth, is the function of a microphone normal? Fifth, is the recording function normal? Sixth, is the recorded music normally performed when reproducing the same?

As a result, due to the several processes which need responses from the human tester, as described above, it is difficult to automate the test of the computer. In addition, since the data storage medium must be ejected and replaced whenever testing is performed to test the video data and the audio data, human testers are required to intervene due to the manual tasks involved, thereby increasing the manufacturing cost and decreasing the manufacturing cost competitiveness.

I have discovered that, even though there currently exist methods and devices testing video and audio signals, the available testing methods and devices lack a degree of precision and also require a tester to respond and intervene during the testing process.

In order to describe the preferred embodiment of the present invention, a compact disc-read only memory (CD-ROM) shall be used as a data storage medium. In order to test a computer automatically, a testing apparatus is provided which converts analog video and audio signals into digital signals and then compares the digital signals into the original information. Here, regularized data are required which are used in testing the connection state of each part relating to audio functions of the computer system and testing gradually the connected apparatus. The details will be explained below.

Figure 6:
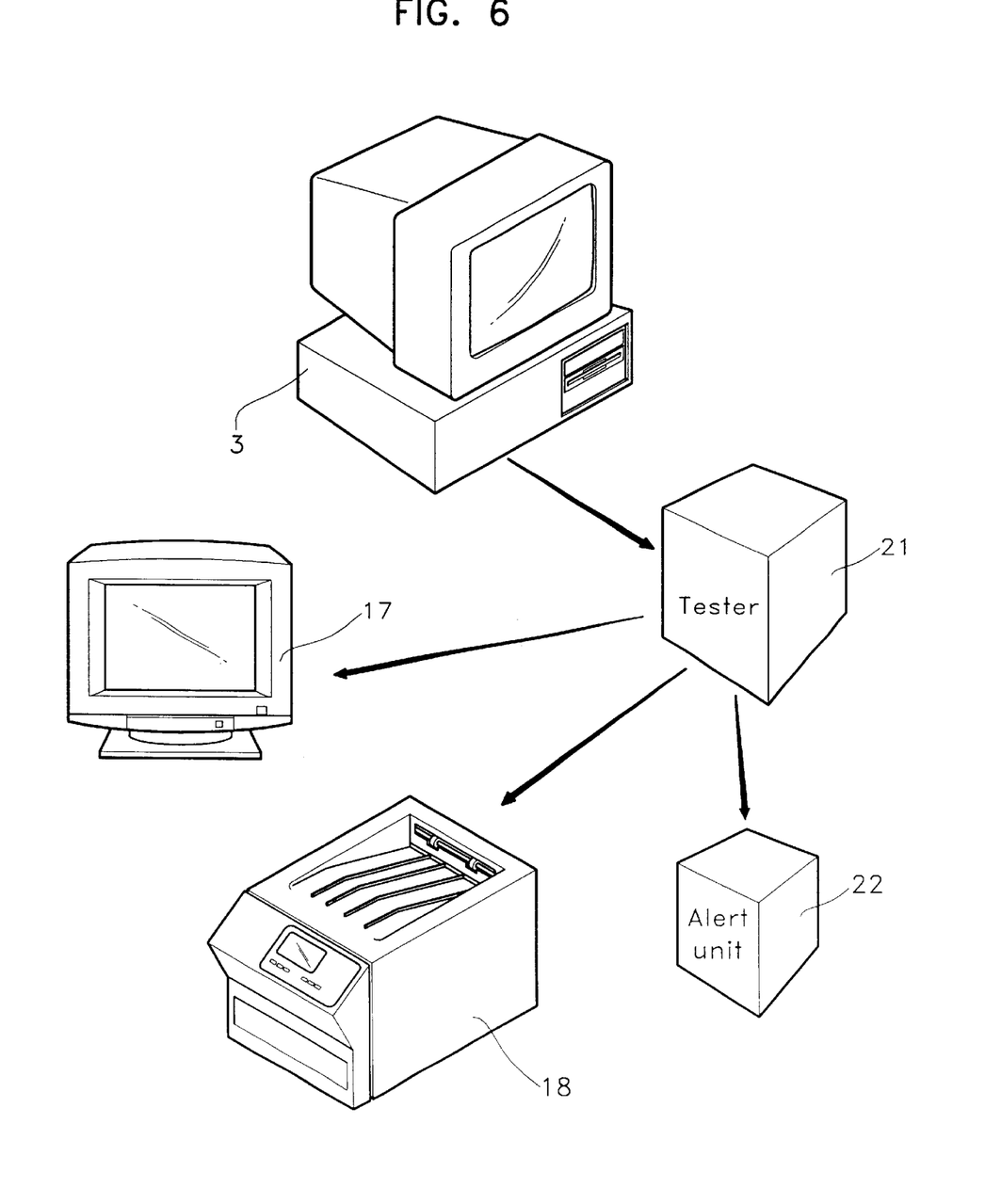
FIG. 6 illustrates a test system used to test a video board of a computer, according to the principles of the present invention.

Turn now to FIG. 6, which illustrates a test system used to test a video board of a computer, according to the principles of the present invention. As shown in FIG. 6, the testing apparatus which converts analog video and audio signals to digital signals includes: a tester 21 which receives a video signal from a computer body 3 in which a video board is provided and tests whether the video board is in a normal state; a monitor 17 connected to the tester 21 displays test results outputted from the tester 21; a printer 18 connected to the tester 21 prints test results outputted from the tester 21; and an alert unit 22 which generates an alarm signal so that a user can easily recognize the case of an abnormal video board.

Figure 7:
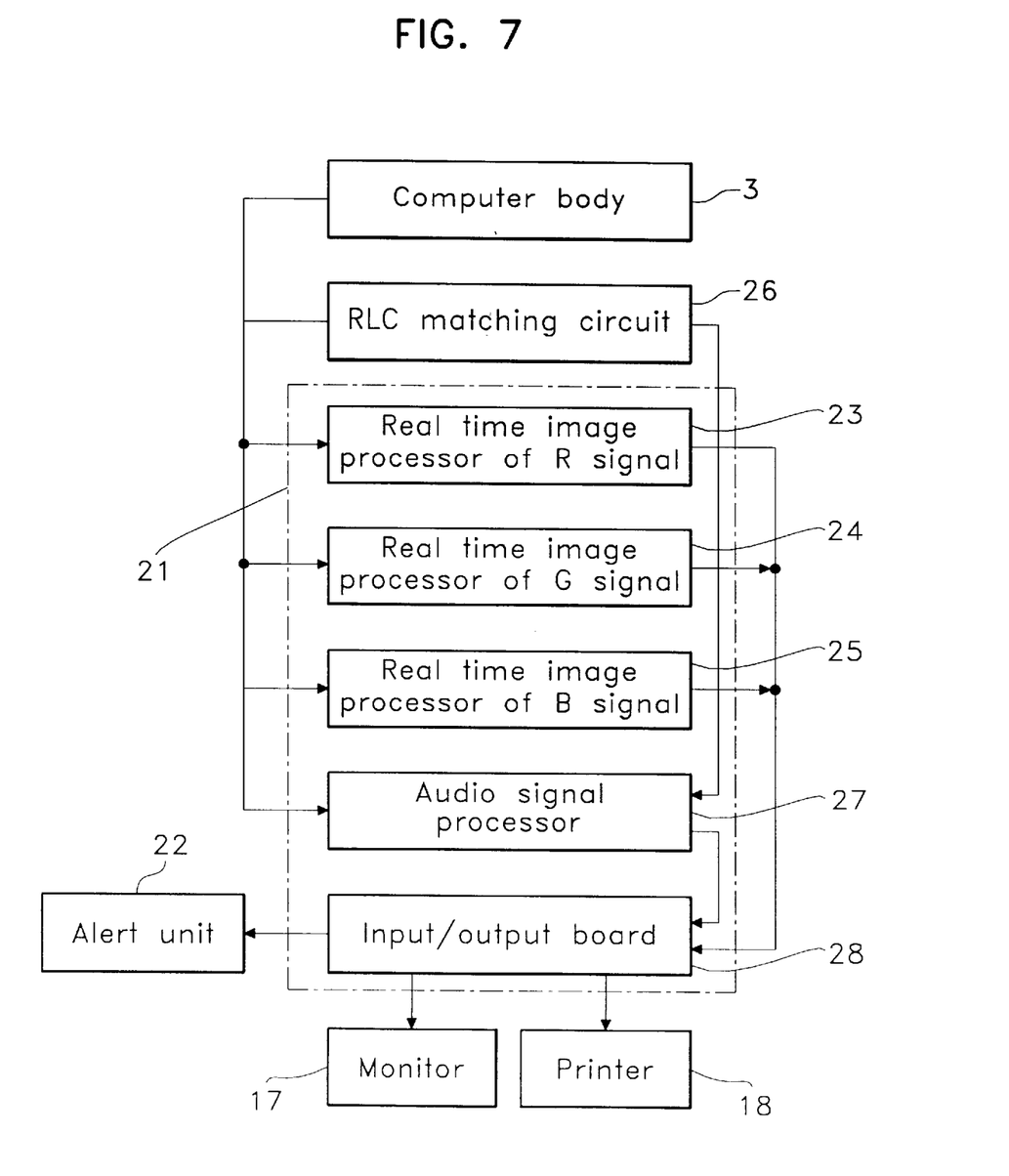
FIG. 7 is a block diagram of the test system shown in FIG. 6, according to the principles of the present invention.

Turn now to FIG. 7, which is a block diagram of the test system shown in FIG. 6, according s to the principles of the present invention. Here, the tester 21 is designed to perform a separate test process by receiving the audio and video signals transmitted from the computer body 3. In other words, the tester 21 includes: real time image processors 23, 24 and 25 which perform signal-processing to reproduce each red, green, and blue (RGB) image by using synchronization signals and R, G, and B signals inputted from a video input/output unit of the computer body 3; a resistance-inductance-capacitance (RLC) matching circuit 26 which matches impedances of the audio signals inputted from an audio input/output unit; an audio signal processor 27 which signal-processes the audio signals in which the impedances are matched by the resistance-inductance-capacitance (RLC) matching circuit 26 so that the audio signals can be reproduced; and an input/output board 28 which interfaces with external devices so that image data converted by the real time image processors 22, 23 and 24 can be transmitted to various output devices such as the monitor 17, the printer 18 or the alert unit 22.

Figure 8:
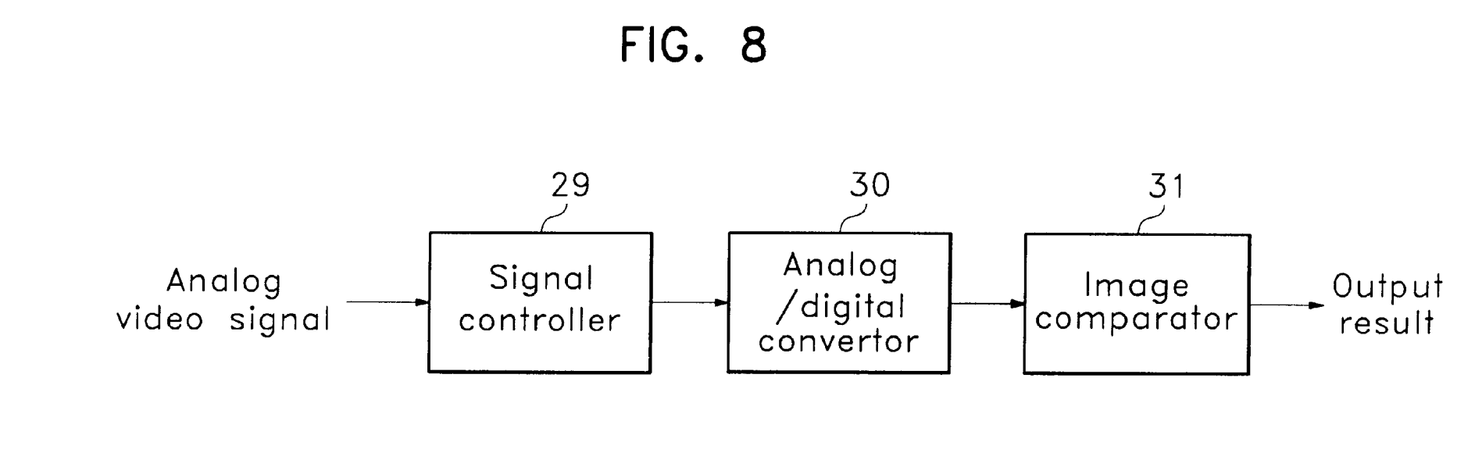
FIG. 8 is a block diagram of a real time image processor shown in FIG. 7, according to the principles of the present invention.

Turn now to FIG. 8, which is a block diagram of a real time image processor shown in FIG. 7, according to the principles of the present invention. The real time image processors 23, 24 and 25, as shown in FIG. 8, filter noise included in the video signal of analog format through a signal controller 29 and convert the signal into an 8 bit target image data using an analog/digital converter 30. After that, they compare the target image data converted by an image comparator 31 with reference image data which is preset, and output the results of the comparison.

Figure 9:
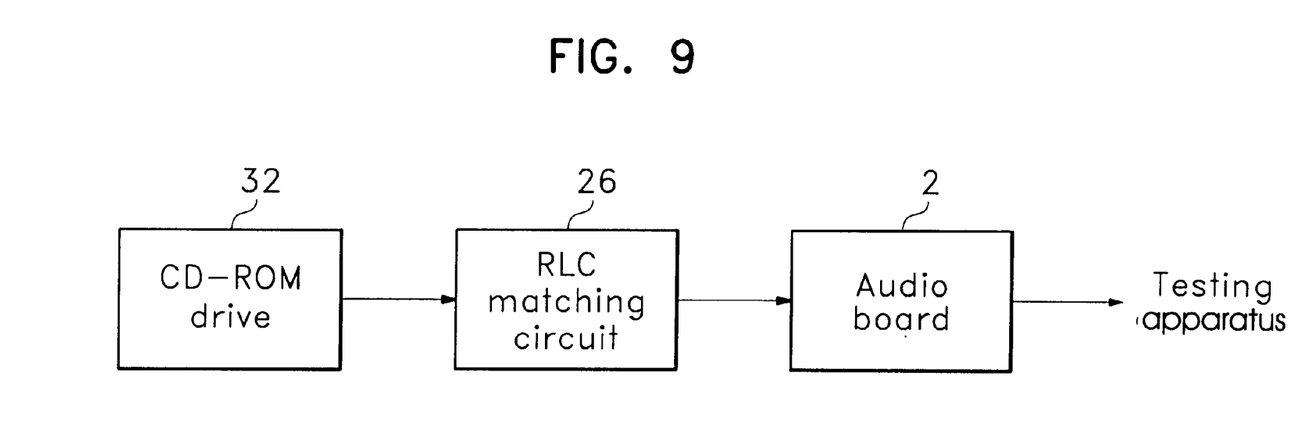
FIG. 9 is a block diagram of a test system used to test an audio board of a computer, according to the principles of the present invention.

Turn now to FIG. 9, which is a block diagram of a test system used to test an audio board of a computer, according to the principles of the present invention. In order to effectively connect an audio board 2 with a CD-ROM drive 32 relating to an audio function of the computer system, as shown in FIG. 9, an earphone output unit of the CD-ROM drive 32 is connected to a microphone input unit of the audio board 2. Moreover, the audio output unit of the audio board 2 is connected to the audio input unit of the tester 21. At this time, as it is possible to have different impedances at the earphone output unit of the CD-ROM drive 32 and at the microphone input unit of the audio board 2, the impedances are matched using a resistance-inductance-capacitance (RLC) matching circuit 26. After that, when a compact disc (CD-ROM) is placed in the CD-ROM drive 32 and then audio data on that compact disc is reproduced or outputted, the reproduced final data is inputted to the tester 21 through the earphone output unit.

Figure 10:
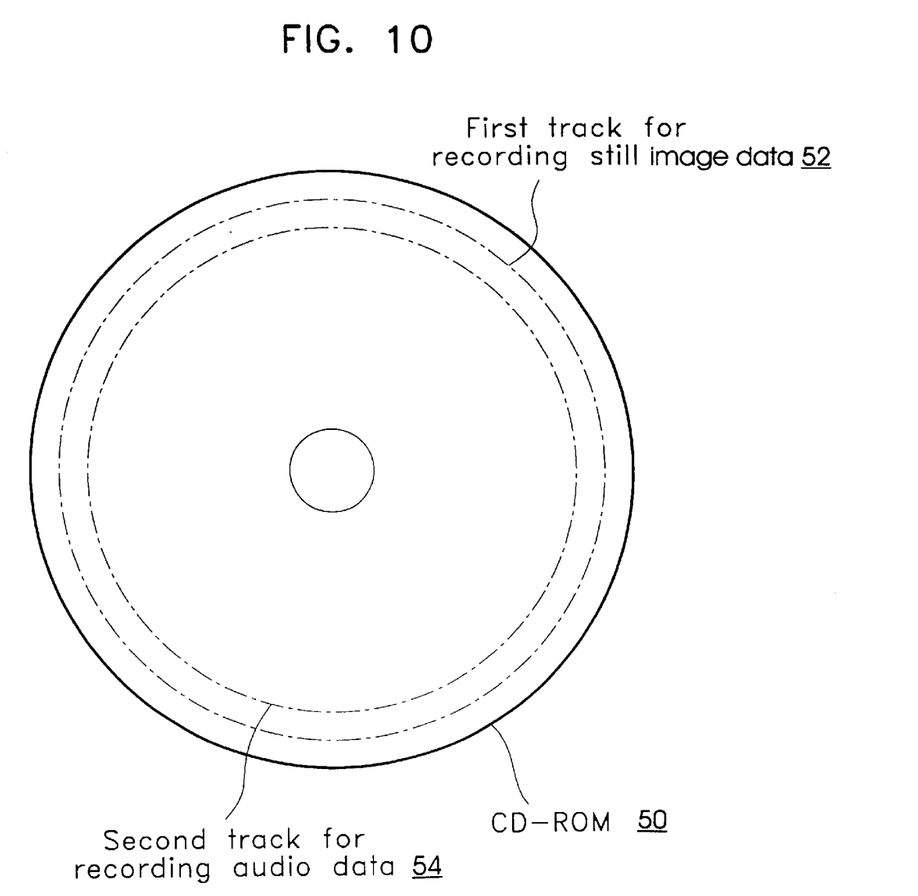
FIG. 10 illustrates a CD-ROM data storage medium storing video data and audio data, according to the principles of the present invention.

Refer now to FIG. 10, which illustrates a CD-ROM data storage medium storing video data and audio data, according to the principles of the present invention. Image data comprising still image data is stored on a first track 52 of a CD-ROM 50. Audio data is stored on a second track 54 of the CD-ROM 50. The image data and audio data stored on the CD-ROM 50 are standardized test data. Standardized test data are required by the present invention. Here, standardized test data corresponds to data which are processed to be suitable to a specific apparatus to achieve a certain aim. In other words, the standardized image data must be designed to enable a verification of the correct functionality of a video board, after the video board receives the standardized image data and outputs final image data. Similarly, the standardized audio data stored on the CD-ROM 50 must be designed to enable verification that an audio board is functioning correctly, after the audio board receives the standardized audio data and outputs final audio data. Note that the still image data can be stored in a first track, moving image data can be stored in a second track, and audio data can be stored in a third track.

Figure 11:
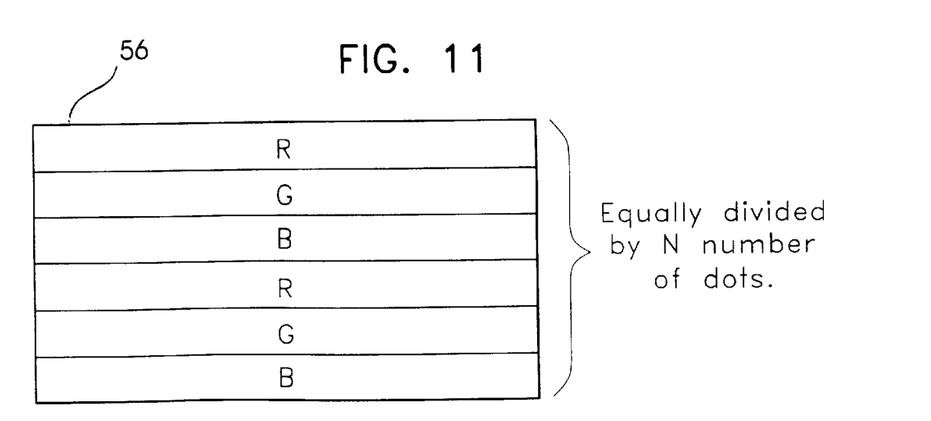
FIG. 11 illustrates an embodiment of a still image of video data, according to the principles of the present invention.

Turn now to FIG. 11, which illustrates an embodiment of a still image of video data, according to the principles of the present invention. The video data for testing is divided into a still image and a moving image. In the case of the still image, the image is tested by displaying an optional regularized pattern. At this time, preferably, the regularized optional pattern is equally divided by n number of dots in the vertical direction, and it desirable to use a pattern 56 having a simple form in which optional colors are arranged successively, as shown in FIG. 11.

In the case of the moving image, when a rapid change between frames occurs such as in a motion picture, it is difficult to sense the change. Accordingly, the moving image is formed by recording an optional pattern used in the still image in the same screen during a predetermined time. For example, when n number of screens are displayed for one second, since the n number of screens are all the same ones, it is easily detected whether the moving image is accurately reproduced by the same method as in the case of the still image. In other words, it can be said that the moving image data comprises a series of still images where each still image is the same.

In the case of the audio data for testing, when a conventional sound is tested, the automatic comparison process is very complicated. This is similar to the case of the video data. Thus, standardized audio data is used to simplify the automatic comparison process. Accordingly, by equally dividing audio signals within an audible frequency range into seven, sounds in the second, fourth and sixth frequency domains are recorded for one second, respectively. The recorded sounds are used as output data. Since the testing apparatus recognizes the frequency size of the inputted data, it is possible to easily sense the reproduced sound which is outputted.

As described above, the video data used for testing purposes is comprised of still image and moving image data. The video data and the audio data for testing purposes is recorded or stored onto different tracks of the CD-ROM 50. By recording the video data in a first track 52 of the CD-ROM 50 and the audio data in a second track 54 of the same CD-ROM 50, the video board and the audio board can both be tested using one CD-ROM. Thus, no human tester is needed to eject a first CD-ROM and replace it with a second CD-ROM. This helps to automate the testing process of the video board and audio board. This also helps to speed up the testing process, since no time is required to replace a CD-ROM in the middle of the testing. In addition, this helps to lower the cost of the testing process, since no human tester is needed to exchange a CD-ROM in the middle of the testing process.

Figure 12:
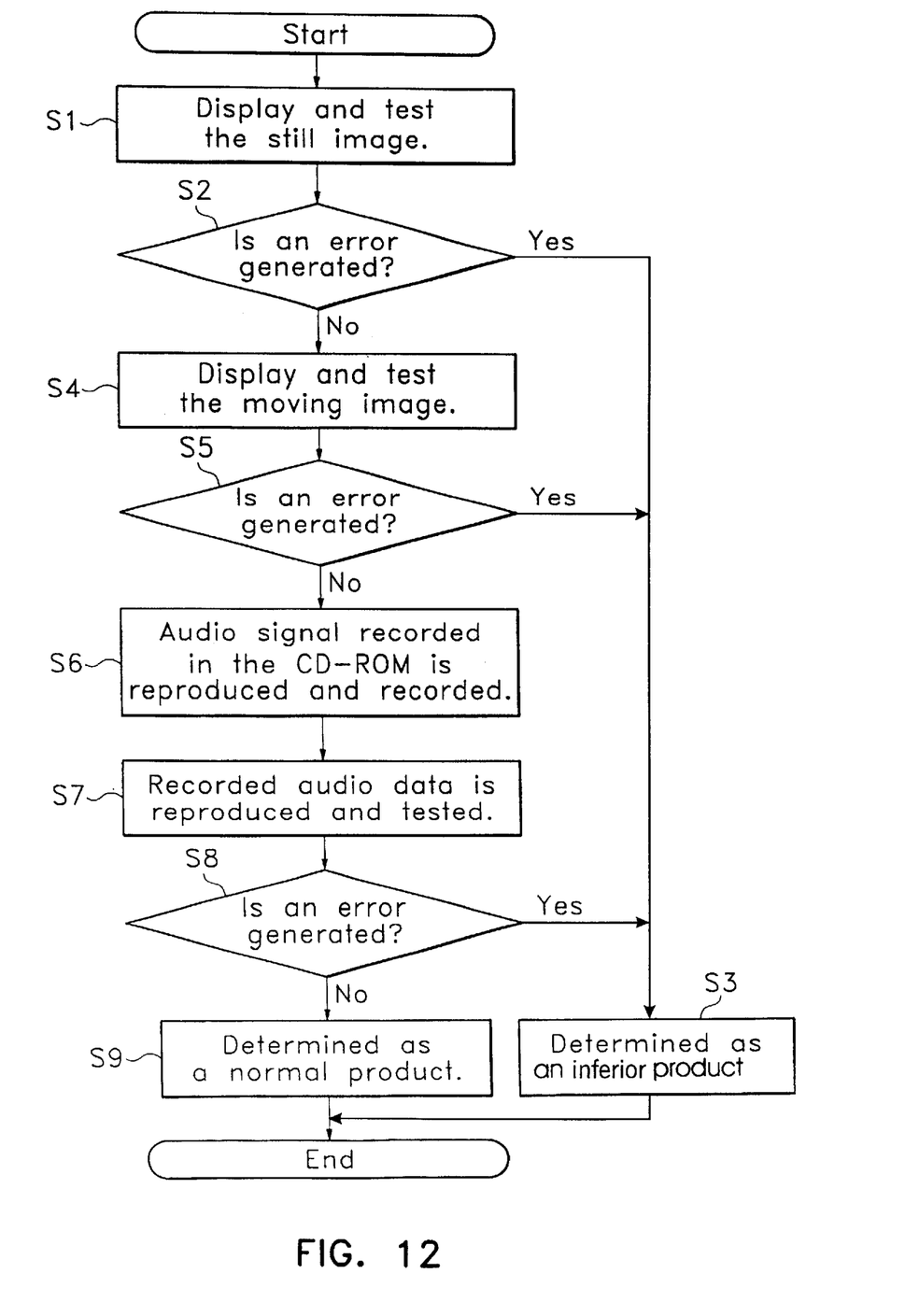
FIG. 12 is a flowchart illustrating a method utilized to automatically test a computer using a data storage medium, according to the principles of the present invention.

Turn now to FIG. 12, which is a flowchart illustrating a method utilized to automatically test a computer using a data storage medium, according to the principles of the present invention. More particularly, the method of FIG. 12 is utilized to automatically test a video board and an audio board of a computer system, with the use of a compact disc (CD-ROM) containing test data. The test data on the CD-ROM includes test video data and test audio data. The data storage medium of FIG. 12 is a compact disc (CD-ROM).

The test video data and the test audio data are both recorded on one CD-ROM. The test video data and test audio data are recorded on different tracks of the one CD-ROM, as shown in FIG. 10. The video board and the audio board are not tested simultaneously, but are tested according to the flowchart shown in FIG. 12. The video board and the audio board are not tested simultaneously since the different tracks of one CD-ROM cannot be reproduced at the same time.

In FIG. 12, at step S1, a still image is displayed and tested in order to test a video board. At step S2, any errors which occur are recognized. At step S3, when an error occurs, the product being tested is identified as an inferior product and this fact is displayed to alert the tester. Alternatively, if no error is detected at step S2, then step S4 is performed. At step S4, a moving image is displayed and tested in order to further test a video board. At step S5, any errors which occur are recognized. At step S3, when an error occurs, the product being tested is identified as an inferior product and this fact is displayed to alert the tester. Alternatively, if no error is detected at step S5, then step S6 is performed. At step S6, an audio signal stored in a CD-ROM is outputted and recorded in order to test an audio board. At step S7, the recorded audio signal is outputted and tested in order to further test the audio board, a microphone, a recording function, and other components. At step S8, any errors which occur are recognized. At step S3, when an error occurs, the product being tested is identified as an inferior product and this fact is displayed to alert the tester. Alternatively, if no error is detected at step S8, then step S9 is performed. At step S9, the products tested are deemed to be functioning normally, and this fact is displayed to alert the tester.

In step S4 of FIG. 12, image data stored on a CD-ROM is read and is then reproduced. In other words, in step S4 of FIG. 12 image data is output. In step S6 of FIG. 12, audio data stored on the CD-ROM is read and is then reproduced. Thus, at some point in time after the beginning of step S4 and before the end of step S6, the reproduction of the image data must cease and the reproduction of the audio data must start. In other words, during the test method of FIG. 12, there is a time when the data to be reproduced is changed from the image data to the audio data. During the time when the data to be reproduced is changed from the image data to the audio data, the video board testing cannot be performed and the audio board testing cannot be performed. Since the audio data is scanned automatically by the CD-ROM drive after it is reproduced, in the case of accessing to the video data during scanning the data, there are many regions to be accessed in the CD-ROM, and thereby a redundancy phenomenon can occur. Accordingly, when reproducing the audio data in the CD-ROM, data on the first track should be ignored and data on the second track should be reproduced.

Figure 13:
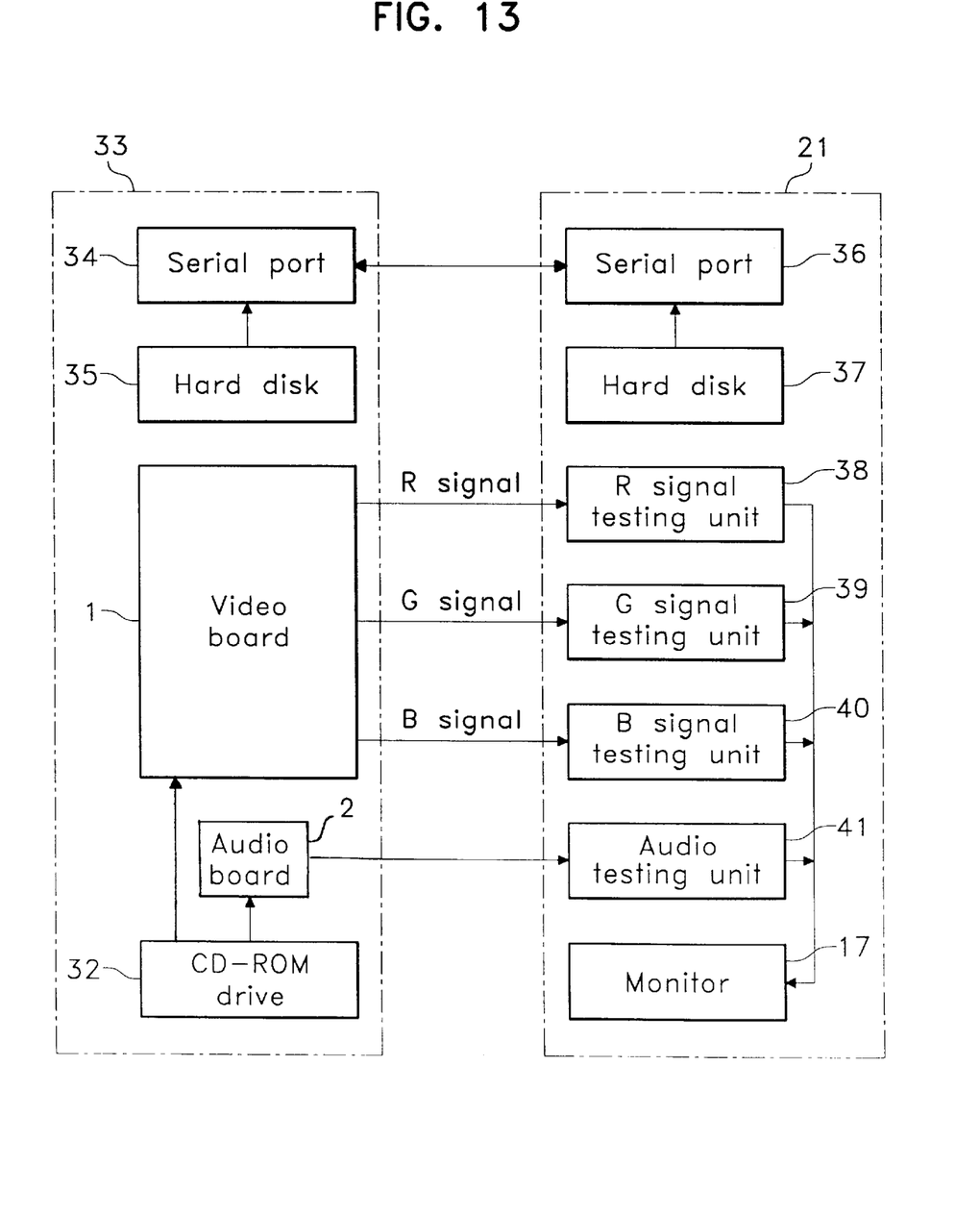
FIG. 13 is a block diagram illustrating an apparatus utilized to automatically test a video board and an audio board of a computer, in order to perform the process shown in FIG. 12, according to the principles of the present invention.

Turn now to FIG. 13, which is a block diagram illustrating an apparatus utilized to automatically test a video board and an audio board of a computer, in order to perform the process shown in FIG. 12, according to the principles of the present invention. As described above, by manufacturing the testing apparatus shown in FIG. 13, the method of automatically testing a computer system can be performed.

As shown in FIG. 13, in the apparatus for automatically testing a computer system, a test target 33 and the tester 21 are depicted. Here, the test target 33 includes a serial port 34 for communicating with the tester 21, a hard disk 35 storing a test program, a video board 1 signal-processing the video information to be tested, a audio board 2 for signal-processing the audio information to be tested, and a CD-ROM drive 32 reading and outputting data stored on a CD-ROM, whereas the data stored on the CD-ROM is to be used to test the video board 1 and the audio board 2.

In FIG. 13, the tester 21 includes a serial port 36 for communicating with the test target 33, a hard disk 37 storing the test program, a red (R) signal testing unit 38, a green (G) signal testing unit 39, a blue (B) signal testing unit, whereas each one of the R, G, and, B signal testing units 38, 39 and 40 compare and test the R, G, and B signals among the output video information transmitted from the video board 1 with the preset test video information, an audio testing unit 41 for comparing and testing the output audio information transmitted from the audio board 2 with the preset test audio information, and a monitor 17 which is separately formed and on which the tested result is finally displayed.

As shown in FIG. 13, a first test request signal is transmitted from port 36 of the tester 21 to port 34 of the test target 33. This first test request signal pertains to the moving image and the still image of the video board 1. When this first test request signal is received by the test target 33, the test target 33 detects the video information to be tested, according to a test program stored in the hard disk 35. The video information to be tested was previously stored on a CD-ROM currently in the CD-ROM drive 32 of the test target 33. The test target 33 then applies the video information to the video board 1. In other words, the test target 33 reads the video information from the CD-ROM in the CD-ROM drive 32 and then outputs the video information to the video board 1. Thus, the video board 1 receives the video information from the CD-ROM in the CD-ROM drive 32.

With continued reference to FIG. 13, after the video board 1 receives the video information, the video board 1 separates the video information into R, G, and B signals and then outputs the R, G, and B signals to the tester 21. The video board 1 can output a still image or a moving image. As shown in FIG. 13, each of the R, G, and B signals outputted from the video board 1 is separately tested by the R, G, and B signal testing units 38, 39 and 40 of the tester 21.

In FIG. 13, the following information applies to moving images compressed in accordance with the Motion Picture Experts Group (MPEG). A moving image may be compressed in the standard format of the Motion Picture Experts Group (MPEG). Note, in the case of hardware that supports moving images in the MPEG format, an MPEG processing apparatus is connected to the video board 1 by an external connector, and the decompressed signal is outputted through an MPEG board.

As shown in FIG. 13, a second test request signal is transmitted from port 36 of the tester 21 to port 34 of the test target 33. This second test request pertains to the the audio signal of the audio board 2. When this second test request signal is received by the test target 33, the test target 33 detects the audio information to be tested, according to the test program stored in the hard disk 35. The audio information to be tested was previously stored on a CD-ROM currently in the CD-ROM drive 32 of the test target 33. The test target 33 then applies the audio information to the audio board 2. In other words, the test target 33 reads the audio information from the CD-ROM in the CD-ROM drive 32 and then outputs the audio information to the audio board 2. Thus, the audio board 2 receives the audio information from the CD-ROM in the CD-ROM drive 32. Then the audio board 2 outputs the audio information to the audio testing unit 41 of the tester 21. As described above, the extraction of the audio information is performed by equally dividing the audible frequency bandwidth into seven (7) and reproducing the recording signal of the second, fourth and sixth frequency domains. Accordingly, the results of the tests are displayed on a monitor 17 and the tester can recognize the results easily.

As a result, according to the apparatus and method utilized to automatically test a computer, the following benefits and effects can be obtained. First, since the video board and the audio board are tested by recording the video data and audio data for testing in one data storage medium and then successively reproducing the recorded video data and audio data for testing, it is unnecessary for the tester to exchange the data storage medium, thereby realizing the automation of the test.

Second, since the optional video data and audio data for testing which are previously set are signal-processed through the video board and the audio board respectively and then signal-processed video data and audio data are compared with the optional video data and audio data which are previously set to test whether the video board and the audio board are normal, it is possible to realize the automation of the test without any response from the tester.

Third, because the automation of the test is realized as described above, the manufacturing cost is reduced and the manufacturing competitiveness is enhanced.

In addition, since the optional video data and audio data for testing are set as the reference data and the reference data are signal-processed through each of the video board and the audio board, and then the signal-processed video data and audio data are compared with the reference data, the reliability of the tested result is enhanced and the inferiority rate of the apparatus is reduced.

The foregoing paragraphs describe the details of an apparatus and method utilized to automatically test a computer, and more particularly, an apparatus and method utilized to test audio and video features of a computer. As described above, test data is stored in a prescribed manner on a data storage medium in order to automate a test of a computer, and then the test data is utilized during automatic testing of the computer. A method of testing the computer is also described above, automatically using the test data stored on the data storage medium. The test data stored on the data storage medium includes video data and audio data stored at different addresses so that a video board and an audio board can be tested using the one data storage medium in order to automate a testing process of the computer. Moreover, the present invention relates more particularly to a method of testing a computer automatically, using the test data stored on the data storage medium, and testing whether the video board and the audio board of the computer are functioning normally using the data storage medium.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of automatically testing a computer system, comprising the steps of:

receiving a primary audio signal in an audible frequency range;

dividing said primary audio signal into a plurality of secondary audio signals corresponding to a plurality of frequency ranges;

detecting said plurality of secondary audio signals;

recording a plurality of detected secondary audio signals onto a data storage medium;

outputting first image data from said data storage medium to a video unit of the computer system;

when said video unit receives said first image data, generating second image data and outputting said second image data;

comparing said first image data with said second image data to establish differences existing between said first image data and said second image data;

detecting whether said video unit is satisfactory, according to said comparing step;

outputting first audio data from said data storage medium to an audio unit of the computer system;

when said audio unit receives said first audio data, generating second audio data and outputting said second audio data;

contrasting said first audio data with said second audio data to establish differences existing between said first audio data and said second audio data; and detecting whether said audio unit is satisfactory, according to said contrasting step.

2. The method of claim 1, wherein said first image data further comprises a first color signal, a second color signal, and a third color signal.

3. The method of claim 2, wherein said first color signal corresponds to red, said second color signal corresponds to green, and said third color signal corresponds to blue.

4. The method of claim 3, wherein said color signals are arranged successively.

5. The method of claim 1, wherein said step of recording said plurality of detected secondary audio signals further comprises:

recording a second detected secondary audio signal;

recording a fourth detected secondary audio signal; and recording a sixth detected secondary audio signal.

6. A data storage medium utilized to test a computer system, comprising:

a memory unit storing digital image data at a first location of said memory unit and storing digital audio data at a second location of said memory unit, said image data and audio data being outputted from said memory unit to a video unit of the computer system and to an audio unit of the computer system, respectively, to test said video unit and said audio unit, wherein said image data further comprises a primary image and a plurality of copies of a secondary image.

7. The data storage medium of claim 6, wherein said memory unit further comprises a compact disc.

8. The data storage medium of claim 7, wherein said first location further comprises:

a first track of said compact disc storing said primary image; and a second track of said compact disc storing said plurality of secondary images, said second track being separately located from said first track.

9. The data storage medium of claim 8, wherein said second location further comprises a third track of said compact disc storing said audio data, said third track being separately located from said first and second tracks.

10. The data storage medium of claim 7, wherein said first location corresponds to a first track of said compact disc.

11. The data storage medium of claim 10, wherein said second location corresponds to a second track of said compact disc, said second track being separately located from said first track.

12. A data storage medium utilized to test a computer system, comprising:

a memory unit storing digital image data at a first location of said memory unit and storing digital audio data at a second location of said memory unit, said image data and audio data being outputted from said memory unit to a video unit of the computer system and to an audio unit of the computer system, respectively, to test said video unit and said audio unit, wherein a method of forming said audio data comprises the steps of:

receiving a primary audio signal in an audible frequency range;

dividing said primary audio signal into a plurality of secondary audio signals corresponding to a plurality of frequency ranges;

detecting said plurality of secondary audio signals; and recording a plurality of detected secondary audio signals.

13. A data storage medium utilized to test a computer system, comprising:

a memory unit storing image data at a first location and audio data at a second location, said image data and audio data being processed by a video unit of the computer system and by an audio unit of the computer system, respectively, to test said video unit and said audio unit, wherein said image data further comprises:

primary image data formed by recording one image; and secondary image data formed by repeatedly recording said one image during a predetermined quantity of time.

14. A data storage medium utilized to test a computer system, comprising:

a memory unit storing image data at a first location and audio data at a second location, said image data and audio data being processed by a video unit of the computer system and by an audio unit of the computer system, respectively, to test said video unit and said audio unit, wherein a method of forming said audio data comprises the steps of:

receiving a primary audio signal in an audible frequency range;

dividing said primary audio signal into a plurality of secondary audio signals corresponding to a plurality of frequency ranges;

detecting said plurality of secondary audio signals; and recording a plurality of detected secondary audio signals.

15. A data storage medium utilized to test a computer system, comprising:

a memory unit storing image data at a first location and audio data at a second location, said image data and audio data being processed by a video unit of the computer system and by an audio unit of the computer system, respectively, to test said video unit and said audio unit, wherein a method of forming said audio data comprises the steps of:

receiving a primary audio signal in an audible frequency range;

dividing a first segment of said primary audio signal into seven secondary audio signals corresponding to seven frequency ranges, said first segment corresponding to an elapsing of one second of time;

detecting said seven secondary audio signals; and recording a plurality of said seven secondary audio signals.

16. A method of automatically testing a video unit and an audio unit of a computer system, comprising the steps of:

outputting first image data from a data storage medium to a video unit of the computer system;

when said video unit receives said first image data, generating second image data and outputting said second image data;

comparing said first image data with said second image data to establish differences existing between said first image data and said second image data;

detecting whether said video unit is satisfactory, according to said comparing step;

displaying a warning message to alert an operator of an inferior product when said video unit is detected to be not satisfactory;

automatically outputting first audio data from said data storage medium to an audio unit of the computer system;

when said audio unit receives said first audio data, generating second audio data and outputting said second audio data;

contrasting said first audio data with said second audio data to establish differences existing between said first audio data and said second audio data;

detecting whether said audio unit is satisfactory, according to said contrasting step; and displaying a warning message to alert an operator of an inferior product when said audio unit is detected to be not satisfactory;

said first image data further comprising:

primary image data formed by recording one image; and secondary image data formed by repeatedly recording said one image during a predetermined quantity of time.

17. The method of claim 16, wherein said primary image data is stored on a first track of a compact disc and said secondary image data is stored on a separately located second track of said compact disc.

18. The method of claim 16, wherein said data storage medium comprises a compact disc.

19. The method of claim 16, wherein said second image data is generated by said video unit and said second audio data is generated by said audio unit.

20. A method of automatically testing a video unit and an audio unit of a computer system, comprising the steps of:

outputting first image data from a data storage medium to a video unit of the computer system;

when said video unit receives said first image data, generating second image data and outputting said second image data;

comparing said first image data with said second image data to establish differences existing between said first image data and said second image data;

detecting whether said video unit is satisfactory, according to said comparing step;

displaying a warning message to alert an operator of an inferior product when said video unit is detected to be not satisfactory;

automatically outputting first audio data from said data storage medium to an audio unit of the computer system;

when said audio unit receives said first audio data, generating second audio data and outputting said second audio data;

contrasting said first audio data with said second audio data to establish differences existing between said first audio data and said second audio data;

detecting whether said audio unit is satisfactory, according to said contrasting step; and displaying a warning message to alert an operator of an inferior product when said audio unit is detected to be not satisfactory;

a method of forming said first audio data comprising the steps of:

receiving a primary audio signal in an audible frequency range;

dividing a first segment of said primary audio signal into seven secondary audio signals corresponding to seven frequency ranges, said first segment corresponding to an elapsing of one second of time;

detecting said seven secondary audio signals; and recording a plurality of said seven secondary audio signals onto said data storage medium.

21. The data storage medium of claim 6, said primary image corresponding to still image data, said plurality of copies of said secondary image corresponding to moving image data.

22. A data storage medium, comprising:

a memory unit storing image data at a first location and audio data at a second location, said image data and audio data being processed by a video unit of the computer system and by an audio unit of the computer system, respectively, to test said video unit and said audio unit;

said image data including primary image data corresponding to still image data, and including secondary image data corresponding to moving image data, said moving image data corresponding to a plurality of copies of a single image.

23. The data storage medium of claim 22, said still image data corresponding to said single image.

24. A method, comprising the steps of:

outputting first image data from a data storage medium to a video unit of the computer system;

when said video unit receives said first image data, generating second image data and outputting said second image data;

comparing said first image data with said second image data to establish differences existing between said first image data and said second image data;

detecting whether said video unit is satisfactory, according to said comparing step; and displaying a warning message to alert an operator of an inferior product when said video unit is detected to be not satisfactory, said first image data including still image data and moving image data, said moving image data corresponding to a plurality of copies of a single image.

25. A data storage medium, comprising:

a memory unit storing image data and audio data, said image data and audio data being processed by a video unit of a computer system and by an audio unit of the computer system, respectively, to test said video unit and said audio unit;

said image data including still image data and moving image data, said moving image data corresponding to a plurality of copies of a single image.

* * * * *